United States Patent [19]

Kawamura et al.

[11] 3,808,812

[45] May 7, 1974

[54] HYDRAULIC CONTROL SYSTEM IN A POWER SHIFT TRANSMISSION OF A CRAWLER TYPE TRACTOR

[75] Inventors: Eiji Kawamura; Hiroyuki Taki, both of Osaka, Japan

[73] Assignee: Kabushiki Kaisha Komatsu Seisakusho, Tokyo, Japan

[22] Filed: Mar. 3, 1972

[21] Appl. No.: 231,512

[30] Foreign Application Priority Data

Mar. 3, 1971   Japan.............................. 46-10579

[52] U.S. Cl. ............................. 60/484, 91/411 R
[51] Int. Cl. ...................... F15b 11/16, B62d 11/00
[58] Field of Search ......... 180/6.7, 6.48; 192/87.13, 192/87.18; 74/720.5; 60/19, 52 S, 484; 91/411 R

[56] References Cited
UNITED STATES PATENTS

| | | | |
|---|---|---|---|
| 2,781,858 | 2/1957 | Kelley et al.......................... | 180/6.7 |
| 3,239,020 | 3/1966 | Morris et al.......................... | 180/6.7 |
| 3,692,160 | 9/1972 | Hilpert................................ | 192/4 C |

*Primary Examiner*—Edgar W. Geoghegan
*Attorney, Agent, or Firm*—Armstrong, Nikaido & Wegner

[57] ABSTRACT

A hydraulic control system in a power shift transmission of a crawler type tractor which has a change-over valve connected to a first branched fluid passage branched from the fluid passage connecting a first speed valve to low speed clutches and also connected to a second branched fluid passage branched from the fluid passage connecting a second speed valve to a first turning valve, and a pressure-reducing valve connected to at least one of the branched fluid passages for reducing the hydraulic pressure of the fluid passage. Thus, abnormal heat generation taking place upon engagement of the clutches in the transmission may be effectively prevented.

5 Claims, 5 Drawing Figures

PATENTED MAY 7 1974    3,808,812

HYDRAULIC CONTROL SYSTEM IN A POWER SHIFT TRANSMISSION OF A CRAWLER TYPE TRACTOR

BACKGROUND OF THE INVENTION

This invention relates to a hydraulic control system in a power shift transmission of a crawler type tractor, and more particularly to a hydraulic control system in a double power shift transmission operating as a steering mechanism of a crawler type tractor.

Heretofore, generally in a steering device with a single train of power transmission of a crawler type tractor as shown in FIG. 1, there are provided right and left steering clutches a and a. Abnormal external loads upon shoe tensioning and shoe slipping is eliminated at the steering clutches a and a. In a steering device with double trains of power transmission of the tractor as shown in FIG. 2, the abnormal external load is directly transmitted to the internal power train. This causes abnormal heat generation in the power train upon engagement of the clutches in the power transmission of the tractor. In addition, this also introduces unstable hydraulic pressure reductions in the clutch circuits in the hydraulic system of the power transmission and resonance of the devices in the power train of the tractor.

SUMMARY OF THE INVENTION

This invention contemplates elimination of the aforementioned disadvantages of the conventional hydraulic control system in a power shift transmission of crawler type tractor, and provides a novel and improved hydraulic control system of a power transmission of a tractor.

It is, therefore, an object of the present invention to provide a hydraulic control system in a power shift transmission of a crawler type tractor which prevents abnormal heat generation which takes place upon engagement of clutches in the power transmission.

It is another object of the present invention to provide a hydraulic control system in a power shift transmission of a crawler type tractor which enables it to absorb abnormal external loads.

It is a further object of the present invention to provide a hydraulic control system in a power shift transmission of a crawler type tractor which eliminates the instability of the pressure reducing operation of the clutch circuits in the power transmission to prevent the resonance of the valves in the hydraulic control system of the transmission.

Briefly, in accordance with the present invention, the foregoing and other objects, in one aspect, are the provision of a hydraulic control system in a double power shift transmission of a crawler type tractor having a plurality of clutch circuits which comprises a change-over valve connected to a first branched fluid passage which is branched from the fluid passage connected between a first speed valve and low speed clutches at one operating port thereof and also connected to a second branched fluid passage which is branched from the fluid passage connecting a second speed valve to a first turning valve at the other operating port thereof. A pressure-reducing valve is connected to at least one of the branched fluid passages for reducing the hydraulic pressure of the fluid passage.

Another aspect of the present invention provides a hydraulic control system in a double power shift transmission of a crawler type tractor which comprises a pressure-reducing valve having a valve body, a spool slidably inserted into the valve body, a coil spring for urging the spool, and a piston also slidably inserted into the valve body in contact with the spool. A selecting valve is provided having a valve body integral with the valve body of the pressure-reducing valve. A spool slidably is inserted into the valve body, a coil spring for urges the spool and pistons are slidably inserted into the valve body in contact, in turn, with the spool and with each other. One of the ports of the valve body of the pressure-reducing valve is connected to a branched fluid passage branched from the fluid passage connecting the first speed valve to the low speed clutches, and one of the ports of the valve body of the selecting valve is communicated with a branched fluid passage branched from the fluid passage connecting the second speed valve to the first turning valve. A self-holding circuit is contained in the selecting valve for holding the communication of the one hydraulic passage with the pressure-reducing valve.

BRIEF DESCRIPTION OF THE DRAWINGS

A more complete appreciation of the present invention will be readily obtained as the same becomes better understood by reference to the following detailed description when taken in conjunction with the accompanying drawings, wherein.

DETAILED DESCRIPTION OF THE PREFERRED EMBODIMENTS

Figure 1:
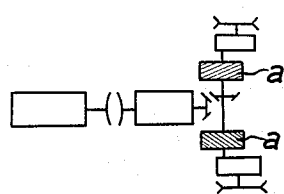
FIG. 1 is a schematic systematic diagram of a single power train of the conventional tractor.
Figure 2:
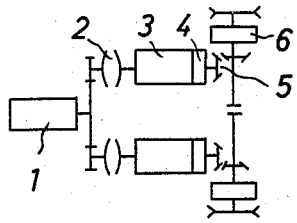
FIG. 2 is a schematic systematic diagram of double power train of the conventional tractor.
Figure 3:
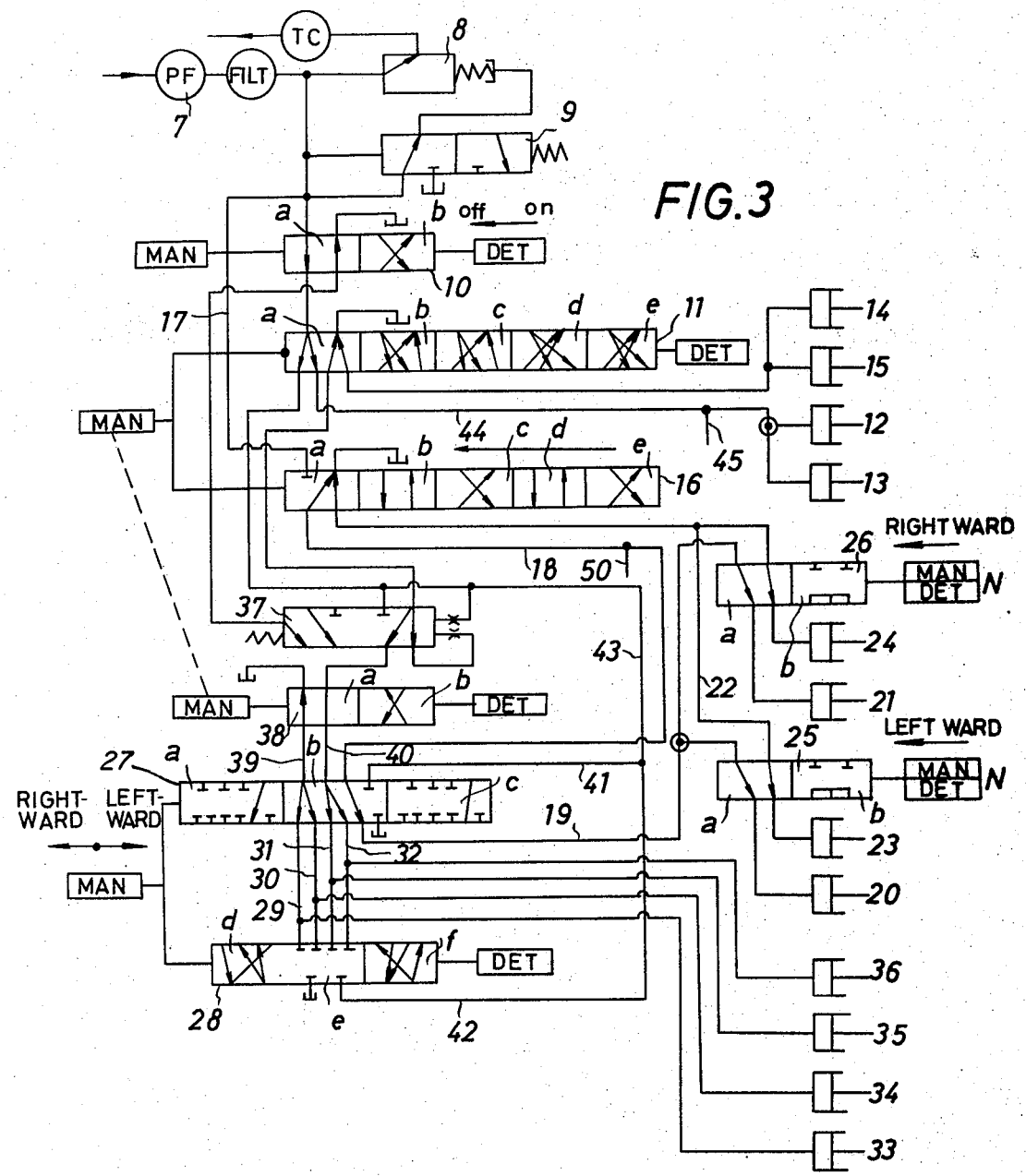
FIG. 3 is a diagrammatic view of the hydraulic control system of the power transmission constructed according to the present invention.

Reference is now made to the drawings, wherein like reference numerals designate identical, or corresponding parts throughout the several views, and more particularly to FIGS. 2 and 3, wherein the hydraulic control system of the power transmission of the present invention is shown as one embodiment thereof.

FIG. 2 shows the power train of a crawler type tractor having double power trains of power transmission adapted for the hydraulic control system of the present invention.

The power derived from an engine 1 of the tractor is equally divided into two power trains in parallel each having a torque converter 2, a hydraulic transmission 3, a brake 4, a bevel gear 5 and final reduction gear 6 so as to drive the right and left track systems independently.

The present invention will be described with respect to forward four-speed and reverse four-speed transmission which is changed in speed and the forward-and-reverse direction and which is steered by a pump as a fluid pressure generating source assembled into one with the valves in two transmissions of double power trains.

In FIG. 3, reference numeral 7 illustrates a hydraulic pump driven by the engine 1. Hydraulic fluid fed under pressure by the pump 7 is set at a predetermined pressure by a pressure modulating valve 8 and a quick return valve 9. The fluid is fed into a first speed valve 11 for selectively varying the speed through a PTO or power take-off valve 10 having valve sections or ports a and b. The PTO valve provides for the transfer of fluid to the low speed parts a, b, and c and high speed parts d and e of the first speed valve 11 thereby providing for the hydraulic fluid flow into the low speed clutches 12, 13 or high speed clutches 14, 15 for shifting the speed at the right and left track systems to selectively engage the respective clutches. Numeral 16 shows a second speed valve simultaneously shifted with the first speed valve 11 and having a neutral part a, first parts b, and d, and second parts c and e. Valve 16 is connected to the input side of PTO valve 10 through a fluid passage 17, and the hydraulic fluid from the fluid passage 17 is fed through the second speed valve 16 and through a fluid passage 18, a turning valve 27 and a fluid passage 19 to the right and left first clutches 21 and 20. The fluid may alternatively be fed through a fluid passage 22 and right and left turning valves 26 and 25 to the right and left second clutches 24 and 23 so as to engage the respective clutches selectively. The respective right and left turning valves 26 and 25 have parts a and b, respectively.

Figure 4:
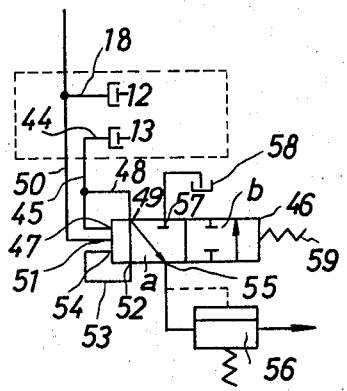
FIG. 4 is a diagrammatic view of the hydraulic control circuit of one embodiment as an essential part of the power transmission of the present invention.

Numerals 27 and 28 show turning valves which have parts or sections a, b, c and d, e, f, respectively. These valves are shifted simultaneously by an operating lever, and these turning valves 27 and 28 are connected by fluid passages 29, 30, 31 and 32 to left and right forward clutches 33 and 34, and left and right reverse clutches 35 and 36, respectively. These clutches 33, 34 and 35, 36 are simultaneously engaged by the shifting operation of a directional valve 38 with hydraulic fluid flowing from the first speed valve 11 through a safety valve 37 in the normal state when turning valves 27 and 28 are neutral, respectively. The fluid passage 19 normally communicates with the fluid passage 18 through the turning valve 27. In addition the fluid passages 39 and 40 connected to valve 27 communicate with the directional valve 38, and a fluid passage 41 communicates with the fluid passage 19 when the turning valve is shifted to the right or left. To the turning valve 28 is connected a fluid passage 42 communicating with the fluid passages 30 and 31 when the turning valve 28 is shifted so the flow is through the part d and with the fluid passages 29 and 31 when the turning valve 28 is shifted so that flow is through the part f and communicated through a fluid passage 43 with the first speed valve 11. A branched fluid passage 45 is branched from a fluid passage 44 connecting from the first speed valve 11 to the low speed clutches 12 and 13. The branched passages 45 are connected to one part 47 of a change-over valve 46 having parts a and b shown in FIG. 4, which shows the essential part of the hydraulic control system of the present invention. A branched fluid passage 48 of the fluid passage 45 is connected to a port 49 of the change-over valve 46. A branched fluid passage 50 is branched from the fluid passage 18, and the fluid passage 50 is connected to the other port 51 of the change-over valve 46. The port 52 of the change-over valve 46 is connected to the port 54 thereof through a fluid passage 53, and the port 55 thereof is connected to a pressure-reducing valve 56. The port 57 of the change-over valve 46 is connected to a tank 58. The change-over valve 46 has a spring 59 for urging the spool therein.

In operation of the thus constructed hydraulic control system of the power shift transmission of the present invention, in normal forward first-speed, the part b of the directional valve 38 is connected to the hydraulic control circuit, and the first and second speed valves 11 and 16 are shifted by the operation of the operating lever to connect the parts b and b thereof to the hydraulic control circuit. More particularly, in this state, hydraulic fluid is fed by the pump 7 through the first speed valve 11 into the right and left low speed clutches 13 and 12 through the fluid passage 44, and is also fed through the safety valve 37 and the directional valve 38 and the turning valve 27 through the fluid passages 39, 29 and 30 into the left and right forward clutches 33 and 34, and is further fed through the second speed valve 16 and the fluid passages 18 and 19 and the turning valve 27 into the left and right first clutches 20 and 21 through the turning valves 25 and 26, respectively so as to engage the respective clutches to obtain the forward first-speed. The hydraulic fluid flowing through the fluid passage 44 is fed through the fluid passage 45 into the port 47 of the change-over valve 46 to actuate the change-over valve 46, and the hydraulic fluid flowing through the fluid passage 18 is fed through the fluid passage 50 into the port 51 of the change-over valve 46 so as to similarly actuate the change-over valve 46 to connect the part a of the change-over valve 46 into the hydraulic control circuit. Thus, the port 49 of the change-over valve 46 communicates with the port 55 so that the hydraulic fluid flows into the pressure-reducing valve 56 with the result that the hydraulic fluid is reduced in pressure by changeover valve 46 as that abnormal frictional heat is released in the clutches upon engagement even under heavy external loads. In order that the change-over valve 46 is not returned by the spring 59 after the reduction of the pressure of the hydraulic fluid, the hydraulic fluid under reduced pressure flows from the port 54 of the change-over valve 46. Thus, since the hydraulic fluid is reduced in pressure by change-over valve 46 the abnormal frictional heat released in the clutching. Therefore, when an abnormal external load is applied to the transmission, it is effectively absorbed or released.

It should be understood from the foregoing description that the hydraulic control system of the present invention provides branched fluid passages branched from at least two clutch circuits of the hydraulic control circuit of a double power shift transmission which serves as a steering mechanism. One branched passage thereof is connected to the pressure-reducing valve to form a pressure-reducing circuit and a change-over valve communicates one fluid passage with a pressure-reducing valve by the flow of the hydraulic fluid from the fluid passage in a pressure-reducing circuit. The hydraulic fluid actuates the change-over valve after the clutches are engaged so that the hydraulic pressure of the fluid is raised to a predetermined pressure to communicate one fluid passage with the pressure-reducing valve with the result that the hydraulic fluid flows into the pressure-reducing valve so that the hydraulic pressure of the fluid is reduced such that abnormal frictional heat is released in the clutches upon engagement thereof. Thus, the abnormal heat generation which takes place upon the engagement of the clutches is prevented and abnormal external loads are released thereby.

Figure 5:
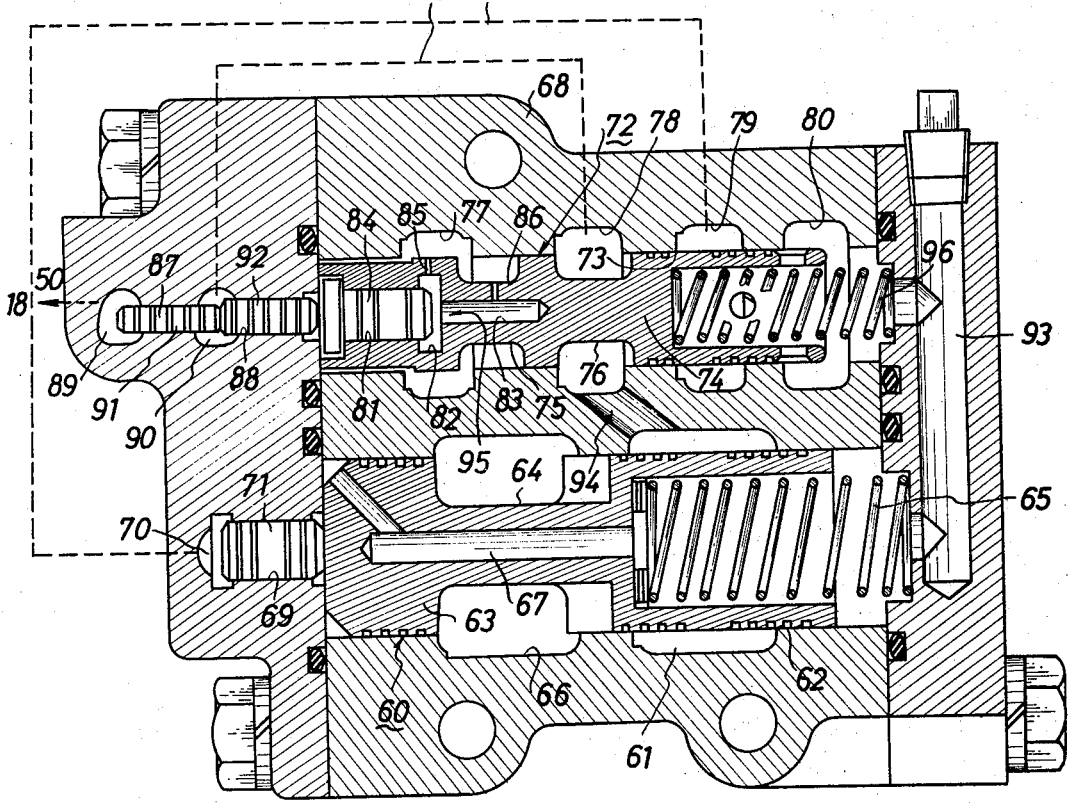
FIG. 5 is a sectional view of the valve structure used as another embodiment of the essential part of the hydraulic control system of the present invention.

Referring now to FIG. 5, which shows the valve structure of the essential part of another embodiment of the hydraulic control system of the present invention, the hydraulic control system comprises a pressure-reducing valve 60 which is assembled in a valve body 68 so that the branched fluid passage 45 is connected to the one port 61 of the pressure-reducing valve 60. The pressure-reducing valve 60 comprises a spool 63 slidably inserted into a spool-inserting hole 62 bored in the valve body 68 and having an annular groove 64 formed thereon, and a coil spring 65 disposed for urging the spool 63 leftwardly of the drawing. The spool-inserting hole 62 has a port 66 communicating with a torque converter circuit (not shown). The spool 63 has a guide hole 67 formed coaxially therein. The valve body 68 has a reduced hole 69 bored coaxially and in communication with the spool-inserting hole 62 at right end of the drawing and in communication with a port 70 at the left end thereof, a piston 71 is slidably inserted into the reduced hole 69 in contact with the spool 63.

The hydraulic control system also comprises a selecting valve 72 which is assembled in the valve body 68 and which has a spool 74 slidably inserted into a spool-inserting hole 73 bored in the integral valve body 68 and having annular grooves 75 and 76 formed thereon, and a coil spring 96 disposed for urging the spool 74 leftwardly of the drawing. The spool-inserting hole 73 has ports 77, 78, 79 and 80. At the left end of the spool 73 of the drawing are formed coaxially a piston-inserting hole 81, a port 82 adjacent to the hole 81, and a bottomed hole 83 adjacent to the port 82, in turn, from the left end thereof. An enlarged piston 84 with a collar is slidably inserted into the piston-inserting hole 81 with enlarged part corresponding to the collar of the piston 84. At the spool 73 are formed an orifice 85 for communicating the port 82 thereof with the port 77 of the selecting valve 72 and an orifice 86 for communicating the bottomed hole 83 with the annular groove 75 thereof. The valve body 68 also has a reduced intermediate hole 88 bored coaxially and in communication with the spool-inserting hole 73, and a further reduced hole 87 bored coaxially and in communication with the reduced intermediate hole 88 through an intermediate port 90 at the right end thereof an also with a port 89 at the left end thereof, and a reduced intermediate piston 92 is slidably inserted into the reduced intermediate hole 88 of the valve body 68 and a further reduced piston 91 is slidably inserted into the further reduced hole 87 of the valve body 68, in contact therewith. The spool-inserting hole 73 communicates with a fluid-guide passage 93 formed at the right end of the valve body 68, and the port 61 of the pressure-reducing valve 60 communicates with the port 78 of the selecting valve 72 through a fluid-guide hole 94. The port 79 of the selecting valve 72 communicates with the port 70 of the pressure-reducing valve 60 through a pilot passage 97. The branched fluid passage 50 is connected to the port 89 of the selecting valve 72.

In the selecting valve 72, the port 78, orifice 86, bottomed hole 83 and port 82, and orifice 85 form a self-holding circuit 95. The port 90 of the selecting valve 72 communicates with the port 78 thereof through a pilot passage 98.

In operation of the hydraulic control system of the power shift transmission of the present invention in normal forward first-speed, in FIGS. 3 and 5, the part b of the directional valve 38 is connected to the hydraulic control circuit. The first and second speed valves 11 and 16 are shifted by the operation of the operating lever to connect the parts b and b thereof to the hydraulic circuit. More particularly, in this case, hydraulic fluid from the pump 7 is fed through the first speed valve 11 into the right and left low speed clutches 13 and 12 through the fluid passage 44, and is also fed through the safety valve 37 and the directional valve 38 and the turning valve 27 through the fluid passages 39, 29 and 30 into the left and right forward clutches 33 and 34. Fluid is further fed through the second speed valve 16 and the fluid passages 18 and 19 and the turning valve 27 into the left and right first clutches 20 and 21 through the turning valves 25 and 26, respectively to engage the respective clutches to obtain the forward first-speed. The hydraulic fluid flowing through the fluid passage 44 is fed through the fluid passage 45 into the port 61 of the pressure-reducing valve 60 through the fluid-guide hole 94 into the port 78 of the selecting valve 72. The port 90 of the selecting valve 72 is connected through the pilot passage 98 to the port 78 thereof. The hydraulic fluid from the fluid passage 18 through the branched fluid passage 50 is introduced into port 89, and the hydraulic fluid in the ports 89 and 90 urges the further reduced piston 91 and the reduced intermediate piston 92 to the right. This causes the movement of the spool 74 through the enlarged piston 84 with a portion of the spool positioned against the coil spring 96. Therefore, the hydraulic fluid of the port 78 is discharged to the port 79 of the selecting valve 72. Since the port 79 of the selecting valve 72 is connected to the port 70 of the pressure-reducing vlave 60 through the pilot passage 97, the hydraulic fluid is introduced to the port 70 of the pressure-reducing valve 60 so as to urge the piston 71 and accordingly the spool 63 of the pressure-reducing valve 60 to the right against the coil spring 65. Accordingly, the hydraulic fluid of the fluid passage 44, that is the port 61 of the pressure-reducing valve 60 is fed through the torque converter circuit through the port 66 thereof to reduce the pressure of the hydraulic fluid in the fluid passage 44 to the clutches 12 and 13 to a predetermined pressure.

When the hydraulic fluid of the fluid passage 44 to the clutches 12 and 13 is reduced, the urging force of the spool 74 of the selecting valve 72 for opening the port 78 to the port 90 through the pilot passage 98 is accordingly reduced so as to lower the urging force of the hydraulic fluid in the port 70. Thus the spool 63 of the pressure-reducing valve 60 is urged to the left by the tension of the coil spring 65 with the result that the communication of the port 61 with the port 66 of the pressure-reducing valve 60 is shut off, and the pressure reduction of the hydraulic fluid in the circuit becomes unstable.

However, if the hydraulic fluid of the port 78 of the selecting valve 72 is discharged into the port 79 upon the rightward movement of the spool 74 of the selecting valve 72 as described above, the hydraulic fluid is introduced from the orifice 86 through the bottomed hole 83 into the port 82 of the spool 74. The reaction force of the hydraulic fluid acts on the pressure-receiving area of the enlarged piston 84 having larger diameter than the further reduced piston 81 and urges the further reduced piston 81 to the right against the force of coil spring 96 on spool 74 until it stops. Therefore, the introduction of the hydraulic fluid from the port 79 of the selecting valve 72 to the port 70 of the pressure-reducing valve 60 becomes stable thus preventing resonance of the selecting valve 72 and the pressure-reducing valve 60.

It should be understood from the foregoing description that the hydraulic control system of the present invention provides branched fluid passages branched from at least two clutch circuits of the hydraulic control circuit of a double power shift transmission serving as a steering mechanism. One branched passage thereof is connected to the pressure-reducing valve to form a pressure-reducing circuit. The selecting valve communicates the one fluid passage with the pressure-reducing valve by the operation of the hydraulic fluid from the fluid passage in the pressure-reducing circuit. The self-holding circuit contained in the selecting valve holds the communication of the one branched fluid passage with the pressure-reducing valve. The hydraulic fluid actuates the selecting valve after the clutches are engaged so that the hydraulic pressure of the fluid is raised to a predetermined pressure to produce communication of one fluid passage with the pressure-reducing valve resulting in the hydraulic fluid flowing into the pressure-reducing valve so that the hydraulic pressure of the fluid is reduced by the change-over valve so that abnormal frictional heat is released in the clutches upon engagement. Thus, the abnormal heat generation which normally takes place upon the engagement of the clutches is prevented and the abnormal external load is released thereby. In addition, since the self-holding circuit holds the communication of the one branched fluid passage with the pressure-reducing valve, the instability in the pressure reduction of the hydraulic fluid in the clutch circuit due to the variation of the hydraulic fluid in the clutch circuit is eliminated so as to prevent the resonance of the selecting valve and the pressure-reducing valve.

Other variations of the foregoing embodiments of the invention will be apparent to those skilled in the art.

What is claimed is:

1. A hydraulic control circuit in a double power shift transmission operating as a steering mechanism of a crawler tractor comprising a hydraulic pump driven by an engine of said tractor for feeding hydraulic fluid, a pressure modulating valve and a quick return valve connected to said hydraulic pump for maintaining a predetermined hydraulic pressure in the hydraulic fluid from said pump, a power take-off valve having first and second valve sections, a first speed valve having first, second and third valve sections for low speed and fourth and fifth valve sections for high speed connected through said power take-off valve to said hydraulic pump for shifting the speed of said transmission by connecting the hydraulic fluid from said pump to low speed clutches or to high speed clutches upon the operation of said power take-off valve, a second speed valve having a neutral valve section, and first, second, third and fourth valve sections said second speed valve being operated simultaneously with said first speed valve and connected through a first fluid passage to one side of said power take-off valve, said second speed valve selectively controlling the flow of the hydraulic fluid into right and left first clutches through a fluid passage, turning valve and another fluid passage and controlling the flow of hydraulic fluid into right and left second clutches through a fluid passage and a turning valve when said second speed valve is shifted, first and second turning valves each connected to fluid passages connected to right and left forward clutches and right and left reverse clutches, respectively, a directional valve connected through a safety valve from said first speed valve to said right and left forward and reverse clutches for shifting the hydraulic fluid between said forward and reverse clutches, a change-over valve connected to a first branched fluid passage branched from the fluid passage connected between said first speed valve and said low speed clutches at one operating valve section thereof and said change-over valve also connected to a second branched fluid passage branched from the fluid passage connected between said second speed valve and said first turning valve at the other operating valve section thereof, and a pressure-reducing valve connected to at least one of said branched fluid passages for reducing the hydraulic pressure in the fluid passage.

2. A hydraulic control circuit as set forth in claim 1, wherein said change-over valve includes a spring means biased against the hydraulic pressure in said branced fluid passages, and a fluid passage connected between one of said branched fluid passages and a valve section of said change-over valve for forming the reduced hydraulic pressure in said branched fluid passages acting against said spring means so that said spring means does not return the valve section after the hydraulic pressure is reduced.

3. A hydraulic control circuit in a double power shift transmission operating as a steering mechanism of a crawler type trail tractor comprising a plurality of clutch circuits each including a pressure-reducing valve, valve means connected through branched hydraulic passages to at least two types of said clutch circuits whereas said pressure-reducing valve is connected to at least one of said branched hydraulic passages to form a pressure-reducing circuit such that said one hydraulic passage communicates with said pressure-reducing valve due to the hydraulic pressure in the other hydraulic passage, and a self-holding circuit included in said valve means for holding the communication of the one hydraulic passage with said pressure-reducing valve.

4. A hydraulic control circuit in a double power shift transmission operating as a steering mechanism of a crawler type tractor comprising a hydraulic pump driven by an engine of said tractor for pumping hydraulic fluid, a pressure modulating valve and a quick return valve connected to said hydraulic pump for providing a predetermined hydraulic pressure to the hydraulic fluid from said pump, a power take-off valve having two valve sections, a first speed valve having three valve sections for low speed and two valve sections for high speed connected through said power take-off valve to said hydraulic pump, said first speed valve shifting the speed of said transmission by connecting the hydraulic fluid from said pump to low speed clutches or to high speed clutches upon the operation of said power take-off valve, a second speed valve having a neutral valve section, first valve sections, and second valve sections and operated simultaneously with said first speed valve, said second speed valve being connected through a fluid passage to one side of said power take-off valve for selectively controlling the hydraulic fluid into right and left first clutches through a fluid passage, a turning valve and another fluid passage and controlling the hydraulic fluid into right and left second clutches through a fluid passage and a turning valve by the shifting of said second speed valve, first and second turning valves each having three valve sections and both connected to fluid passages connected to right and left forward clutches and right and left reverse clutches, respectively, a directional valve connected through a safety valve between said first speed valve and said right and left forward and reverse clutches for shifting the hydraulic fluid between said forward and reverse clutches, a pressure-reducing valve including a valve body having a spool-inserting hole, first and second valve sections formed with the spool-inserting hole at one end thereof and a third valve section formed in communication with the reduced hole at the other end thereof, and a fluid guide passage, a spool slidably inserted into said spool-inserting hole and having an annular groove formed thereon and a reduced fluid-guide hole coaxially formed therein, a coil spring for urging said spool into the spool-inserting hole of said valve body, and a piston slidably inserted into the reduced hole of said valve body in contact with said spool at one end thereof, the spool-inserting hole of said selecting valve communicating at the spring side with the fluid-guide passage of said valve body, one of the valve sections of said valve body being connected to a branched fluid passage branched from the fluid passage between the first speed valve and the low speed clutches, a selecting valve having a valve body integral with the valve body of said pressure-reducing valve, said selecting valve having a spool-inserting hole, a reduced intermediate hole bored coaxially and in communication with said spool-inserting hole, a further reduced hole bored coaxially and communicating through an intermediate port with said reduced hole at one end and a port communicating with the further reduced hole at the other end thereof, a spool slidably inserted into said spool-inserting hole of said selecting valve said spool having a plurality of annular grooves formed thereon, a reduced hole coaxially formed therein at one end in contact with the reduced hole of said valve body through an enlarged part, a further reduced hole coaxially formed therein in communication with said reduced hole through a port communicating through a first orifice with one of said valve sections of said selecting valve, a second orifice formed in communication with one of said valve sections of said selecting valve, and a piston with a collar slidably inserted into the reduced hole with the enlarged part, a coil spring for urging said spool in the spool-inserting hole of said valve body, a reduced piston slidably inserted into the further reduced hole of said valve body, and a reduced intermediate piston slidably inserted into the reduced intermediate hole of said valve body, said valve body having a fluid-guide hole for communicating between one of the valve sections of said pressure-reducing valve and one of the valve sections of said selecting valve, another of the valve sections of said selecting valve communicating with the port of the reduced hole of said pressure-reducing valve through a first pilot passage, the port of the further reduced hole of said selecting valve communicating with a branched fluid passage branched from the fluid passage connected from the second speed valve to the first turning valve, and the one of the valve sections of said selecting valve communicating with the intermediate port of said valve body of said selecting valve through a second pilot passage.

5. A hydraulic control circuit as set forth in claim 4, including said self-holding circuit comprising a valve section of said selecting valve, the first orifice, the further reduced hole of the spool of said selecting valve with the port, and the second orifice of the spool of said selecting valve.

* * * * *